H. B. JONES.
Bale-Ties.

No. 156,292.　　　　　　　　　　Patented Oct. 27, 1874.

WITNESSES:
E. Wolff
A. F. Terry

INVENTOR:
H. B. Jones
BY Munn & Co.
ATTORNEYS.

UNITED STATES PATENT OFFICE.

HENRY B. JONES, OF BURTON, TEXAS.

IMPROVEMENT IN BALE-TIES.

Specification forming part of Letters Patent No. 156,292, dated October 27, 1874; application filed August 29, 1874.

CASE A.

*To all whom it may concern:*

Be it known that I, HENRY B. JONES, of Burton, in the county of Washington and State of Texas, have invented a new and Improved Bale-Tie, of which the following is a specification:

My invention consists of one or more slots or perforations in each end portion of the hoop, in the form of an ordinary key-hole, and a fastening or fastenings in the form of a key to be inserted when the hoop is drawn together over the bale and the end portions overlapped, so that a hole or holes in each part allow one or more keys to pass through both, and the keys to be turned around and lock the hoop by the bits being turned away from the portions of the slots through which they pass, and being held against turning back by the compressed cotton into which they are pressed. It is designed, in practice, to have a series of holes in each end portion of the hoop, so that two keys can be used; also so that the hoop can be taken up short and again used on the compressed or repressed bale.

Figure 1:
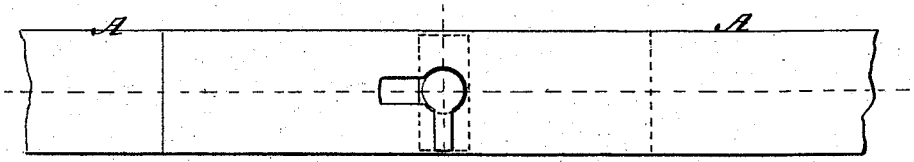
Figure 2:
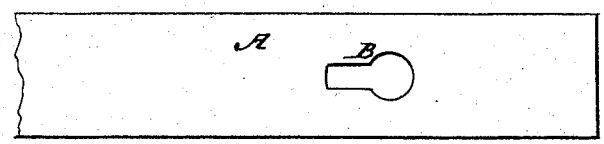
Figure 3:
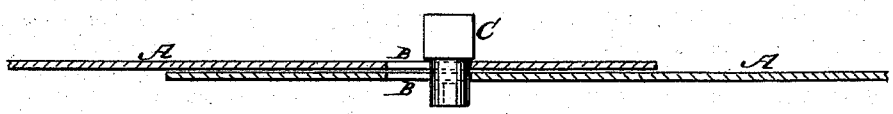
Figure 4:
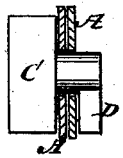

Figure 1 is a plan view of a bale-hoop fastened by my improved tie. Fig. 2 is a plan of one end portion of a hoop. Fig. 3 is a longitudinal sectional elevation of Fig. 1, taken on the line *x x*. Fig. 4 is a cross-section, taken on the line *y y* of Fig. 1.

Similar letters of reference indicate corresponding parts.

A represents the end portions of the bale-hoop, in each of which I propose to make one or more key-hole-shaped slots, B, for fastening them on the bale by a key or button, C, passing through both end portions, as shown, to be secured by a bit, D, on it, to be turned around from its portions of the slots and be held, so as not to turn back, by the fibers of the bale into which it will be pressed. the said key having a large head, which is held snugly against one side by the bit on the other side, so as to prevent it from being drawn obliquely to its true position. It will probably be best, in practice, to use two of these keys for each hoop, one being in the hole of each portion nearest the end; but one may be sufficient.

This kind of fastening admits of taking up the hoop at both ends, which is much better than to take up one end only, when much is to be taken up. It also possesses the additional advantage of holding the hoops tightly in the position in which the key is first inserted, while, in other bale-ties, the elasticity of the bale causes them to slip up into the slots from one to two inches, and the said hoops to be relaxed and the bale expanded to that extent.

Having thus described my invention, I claim as new and desire to secure by Letters Patent—

The key, consisting essentially of the head C, a short shank, and a radially-projecting bit, D, having sharp corners to clutch the fibers of the bale, in combination with the key-hole slots in the ends of the hoop, all constructed and arranged substantially as and for the purpose described.

HENRY BRADLY JONES.

Witnesses:
JEFFERSON BASSETT,
TYRRELL J. ROBERSON.